(12) United States Patent
Orhan et al.

(10) Patent No.: US 12,074,753 B2
(45) Date of Patent: Aug. 27, 2024

(54) METHODS AND DEVICES FOR SIGNAL DEMODULATION

(71) Applicant: Intel Corporation, Santa Clara, CA (US)

(72) Inventors: Oner Orhan, San Jose, CA (US); Hosein Nikopour, San Jose, CA (US); Mehnaz Rahman, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 683 days.

(21) Appl. No.: 17/131,901

(22) Filed: Dec. 23, 2020

(65) Prior Publication Data

US 2022/0200837 A1 Jun. 23, 2022

(51) Int. Cl.
*H04L 27/38* (2006.01)
*H04L 27/00* (2006.01)
*H04L 27/22* (2006.01)
*H04L 27/34* (2006.01)

(52) U.S. Cl.
CPC .......... *H04L 27/38* (2013.01); *H04L 27/0008* (2013.01); *H04L 27/0014* (2013.01); *H04L 27/22* (2013.01); *H04L 27/3405* (2013.01); *H04L 27/3488* (2013.01); *H04L 2027/0026* (2013.01)

(58) Field of Classification Search
CPC . H04L 27/38; H04L 27/0008; H04L 27/0014; H04L 27/22; H04L 27/3405; H04L 27/3488; H04L 2027/0026
See application file for complete search history.

(56) References Cited

U.S. PATENT DOCUMENTS 6,421,400 B1 * 7/2002 Rhee ................. H04L 1/006
375/329
8,542,573 B2 * 9/2013 Liu ................. H04L 27/2636
375/240.03

* cited by examiner

*Primary Examiner* — Vineeta S Panwalkar
(74) *Attorney, Agent, or Firm* — VIERING, JENTSCHURA & PARTNER MBB

(57) ABSTRACT

A communication device including one or more processors configured to determine a first signal component of a received modulated signal; determine a second signal component of the received modulated signal; generate a phase shift of the first signal component; generate a phase shift of the second signal component; compare the phase shift of the first signal component and the phase shift of the second signal component with each other; and generate a plurality of constellation points, wherein each of the plurality of constellation point is based on the determination of the first signal component, the determination of the second signal component, and the comparison.

20 Claims, 9 Drawing Sheets

METHODS AND DEVICES FOR SIGNAL DEMODULATION

TECHNICAL FIELD

Various aspects of this disclosure relate generally to methods and devices for demodulating a signal and efficiently generating a signal constellation scheme.

BACKGROUND

Wireless chip to chip communication may be prone to power consumption inefficiencies as compared to wired solutions. Improvements in power efficiency in wireless chip to chip communications may allow it to compete with wired solutions. One aspect of wireless chip to chip communication which can be improved is in signal demodulation. Multi-bit quantization of signals at high speed may be inefficient and have an undesired impact. Power efficient analog to digital converters for demodulating a signal may reduce power consumption.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
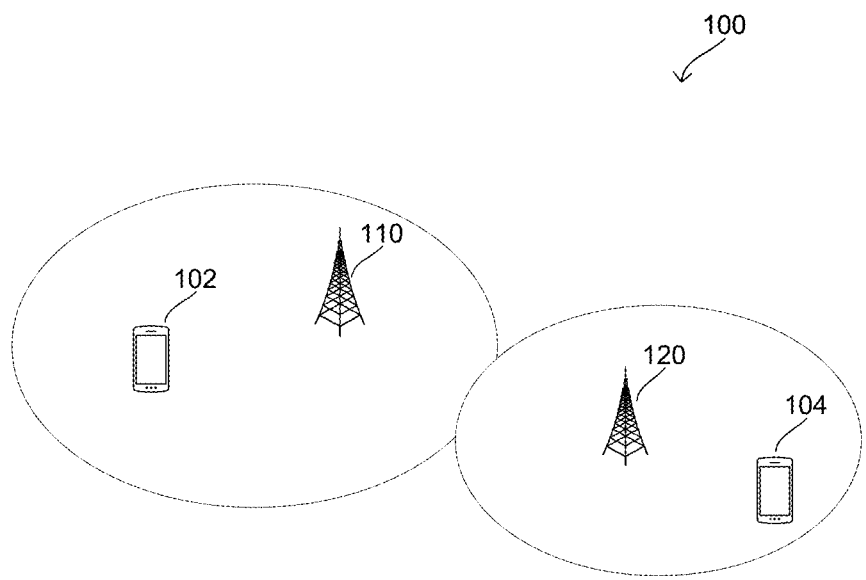
FIG. 1 shows an exemplary radio communication network according to some aspects.

The following detailed description refers to the accompanying drawings that show, by way of illustration, specific details and aspects of embodiments in which the invention may be practiced.

The word "exemplary" is used herein to mean "serving as an example, instance, or illustration." The words "plurality" and "multiple" in the description and claims refer to a quantity greater than one. The terms "group," "set", "sequence," and the like refer to a quantity equal to or greater than one. Any term expressed in plural form that does not expressly state "plurality" or "multiple" similarly refers to a quantity equal to or greater than one. The term "lesser subset" refers to a subset of a set that contains less than all elements of the set. Any vector and/or matrix notation utilized herein is exemplary in nature and is employed for purposes of explanation. Aspects of this disclosure described with vector and/or matrix notation are not limited to being implemented with vectors and/or matrices and the associated processes and computations may be performed in an equivalent manner with sets or sequences of data or other information.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), gNodeBs, Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax), 5G New Radio (NR), for example, and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers.

This disclosure includes power efficient techniques for demodulating a radio frequency signal. Multi-resolution and non-uniform ADCs may require more power as compared to 1-bit ADCs. Quantizers, such as ADCs, measuring signal amplitude require precise amplitude control. This is difficult to achieve at high sampling rates. Additionally, performance may degrade due to received signal amplitude sensitivity.

Demodulating radio frequency signals using 1-bit ADCs is disclosed. 1-bit ADCs measure the voltage of a signal wave and are not sensitive to a received signal amplitude. Demodulating an RF signal using 1-bit ADCs requires less power than multi-resolution or non-uniform ADCs and is not prone to performance degradation due to amplitude sensitivity at high sampling rates.

Figure 2:
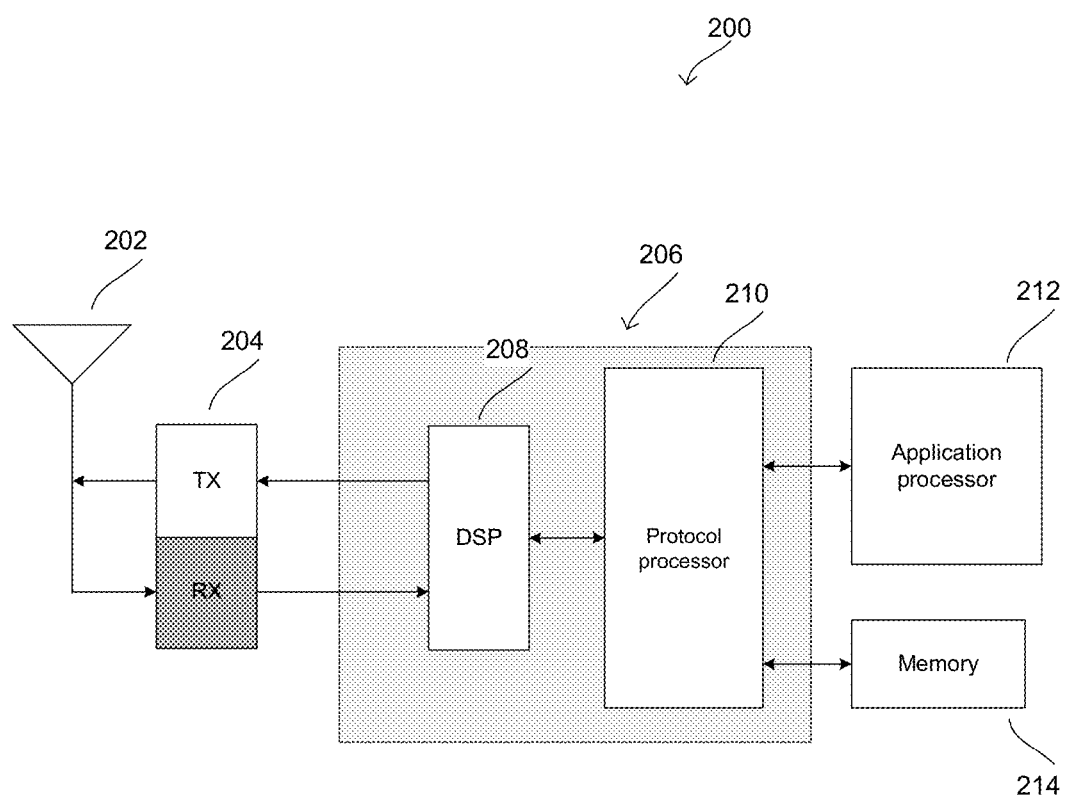
FIG. 2 shows an exemplary internal configuration of a terminal device according to some aspects.

FIGS. 1 and 2 depict an exemplary network and device architecture for wireless communications. Starting with FIG. 1, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3 GPP) networks, WLAN/WiFi, Bluetooth, 5G NR, mmWave, etc.), these examples may be applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks. The cellular core network may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104. The core network may also provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Terminal devices 102 and 104 and network access nodes 110 and 120 may therefore follow the defined communication protocols to transmit and receive data over the radio access network of radio communication network 100. The core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an internal configuration of terminal device 102 according to some aspects. As shown in FIG. 2, terminal device 102 may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct this communication functionality of terminal device 102 according to the communication protocols associated with each radio access network. Baseband modem 206 may thus control antenna system 202 and RF transceiver 204 to transmit and receive radio signals according to the formatting and scheduling parameters for the communication protocols. In some aspects where terminal device 102 is configured to operate on multiple radio communication technologies, terminal device 102 may include separate communication components for each supported radio communication technology (e.g., a separate antenna, RF transceiver, digital signal processor, and controller).

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) for baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), with which RF transceiver 204 may convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals for antenna system 202 to wirelessly transmit. RF transceiver 204 may include analog and digital transmission components including amplifiers (e.g., Power Amplifiers (PAs)), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204. This may include specifying the radio frequencies RF transceiver 204 to transmit or receive on.

As shown in FIG. 2, baseband modem 206 may include digital signal processor 208, which may perform physical layer (PHY; Layer 1) transmission and reception processing. In the transmit path, digital signal processor 208 may prepare outgoing transmit data (from protocol controller 210) for transmission via RF transceiver 204. In the receive path, digital signal processor 208 may prepare incoming received data (from RF transceiver 204) for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or Field-Programmable Gate Arrays (FPGAs)), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., Application Specific Integrated Circuits (ASICs), FPGAs, and other hardware) that are digitally configured to specific execute processing functions. The one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) according to the communication protocols of each supported radio communication technology. In some aspects, protocol controller 210 may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 102 to transmit and receive communication signals according to the protocol stack control logic in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to transfer application layer data to and from radio terminal device 102 with the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 102 may also include application processor 212 and memory 214. Application processor 212 may be a CPU configured to handle the layers above the protocol stack, including the transport and application layers. Application processor 212 may be configured to execute various applications and/or programs of terminal device 102 at an application layer of terminal device 102. These applications and/or programs may include an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between network access nodes of the radio access network of radio communication network 100. As each network access node of radio communication network 100 may have a respective coverage area, terminal devices 102 and 104 may be configured to select and re-select between the available network access nodes to maintain a strong radio link with the radio access network of radio communication network 100. For example, terminal device 102 may establish a radio link with network access node 110 while terminal device 104 may establish a radio link with network access node 112. In the event that the current radio link degrades, terminal devices 102 or 104 may seek a new radio link with another network access node of radio communication network 100. For example, terminal device 104 may move from the coverage area of network access node 112 into the coverage area of network access node 110. As a result, the radio link with network access node 112 may degrade. Terminal device 104 may detect that degradation with radio measurements such as signal strength or signal quality measurements of network access node 112. Depending on the mobility procedures defined in the appropriate network protocols for radio communication network 100, terminal device 104 may seek a new radio link (which may be, for example, triggered at terminal device 104 or by the radio access network). In some cases, terminal device 104 may search for a new radio link by performing radio measurements on neighboring network access nodes to determine whether any neighboring network access nodes can provide a suitable radio link. As terminal device 104 may have moved into the coverage area of network access node 110, terminal device 104 may identify network access node 110 (which may be selected by terminal device 104 or selected by the radio access network) and transfer to a new radio link with network access node 110. These mobility procedures, including radio measurements, cell selection/reselection, and handover, are defined in the various network protocols.

RF signal demodulation may be power hungry and prone to errors. For example, performance loss due to received signal amplitude sensitivity and circuit impairments on amplitude. Additionally, multi-bit quantization considered at high speeds, such as sampling rate, may require large power consumption. For example, a data bandwidth of 10 GHz may include a sampling rate of 10 giga samples per second. Existing I/Q may require precise amplitude control which can be difficult to achieve at very high sampling rates. A polar quantizer architecture configured to demodulate PSK communications may be designed to reduce power consumption. Wireless chip to chip communications requires low power communication, but incurs impairments at the received signal. In addition, increasing communication bandwidth (sampling rate) may increase power efficiency by reducing bits/Joule.

Figure 3:
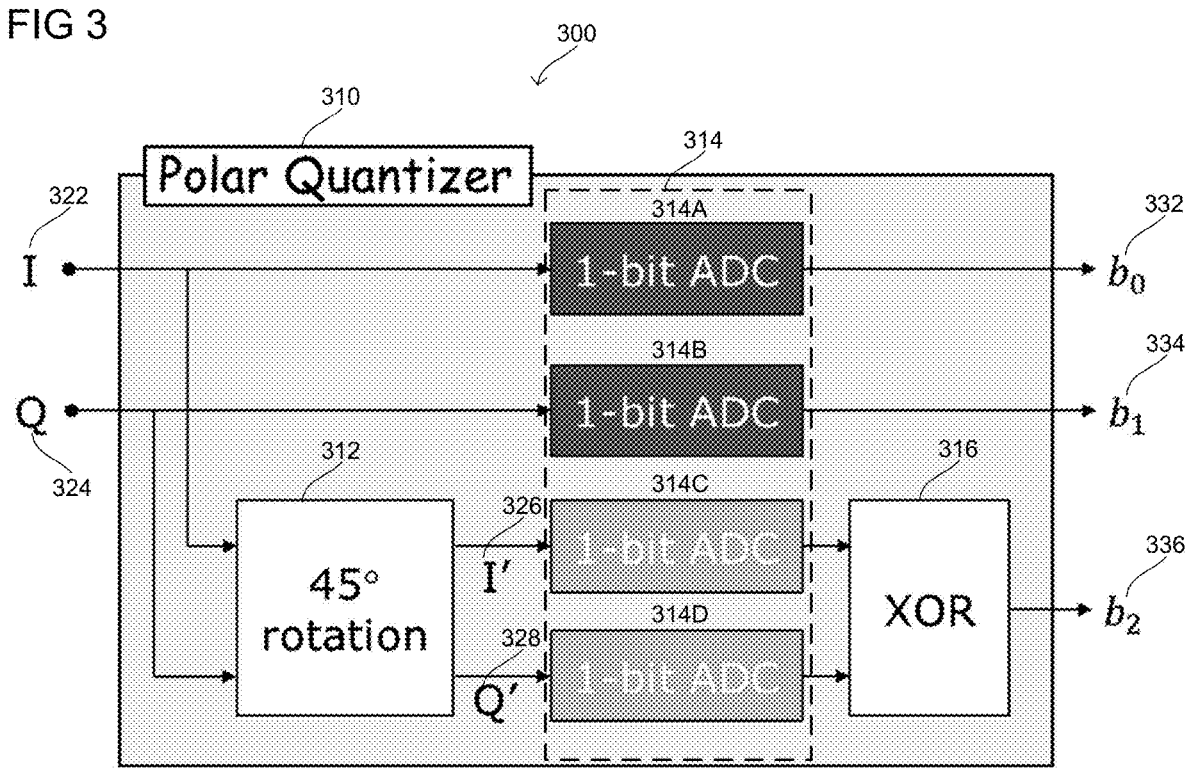
FIG. 3 shows an exemplary demodulator according to some aspects.

FIG. 3 depicts polar quantizer 310 configured to demodulate a radio frequency signal. Polar quantizer 310 may include phase shifter 312, a plurality of 1-bit analog to digital converters (ADCs) 314, and logic gate 316. Polar quantizer 310 is configured to generate 8 constellation points. Signal in-phase component 322 and quadrant component 324 are input into polar quantizer 310. Phase shifter 312 rotates in-phase component 322 and quadrant component 324 45 degrees to generate in-phase component phase shift 326 and quadrant component phase shift 328. In-phase component 322 is input into ADC 314A to generate first bit 332. Quadrant component 324 is input into ADC 314B to generate second bit 334. In-phase component phase shift 326 is input into ADC 314C and quadrant component phase shift 328 is input into ADC 314C. ADCs 314C and 314D generate a bit based on their input. The generated bits are compared at logic gate 316. For example, an XOR gate. The output of logic gate 316 is third bit 336.

Polar quantizer 310 may be configured to generate 8 constellation points for an 8-phase shift key (PSK) constellation. For example, all possible variations of first bit 332, second bit 334, and third bit 336 make up three bits of each constellation point of an 8 PSK constellation.

The plurality of ADCs 314 may be configured to quantize an analog signal and generate 1 bit. For example, each ADC 314A may generate a first bit 332 based on the in-phase component 322 of a radio frequency (RF) signal. A signal component, or phase shift of a signal component may be described as positive when the wave is at a positive voltage. Similarly, a signal component, or phase shift of signal component, may be described as negative when the wave is at a negative voltage. If in-phase component 322 is positive, ADC 314A may generate a 0. If in-phase component 322 is negative, ADC 314A may generate a 1. ADC 314B may generate a second bit 334 based on the quadrant component 324 of a radio frequency (RF) signal. If quadrature component 324 is positive, ADC 314A may generate a 1. If quadrature component 324 is negative, ADC 314A may generate a 0. Similarly, ADCs 314C and 314D may each generate a bit based on in-phase component phase shift 326 and quadrant component phase shift 328 respectively. Logic gate 316 may compare a the two bits generated by ADCs 314C and 314D and generate a third bit 336 based on the comparison.

Figure 4:
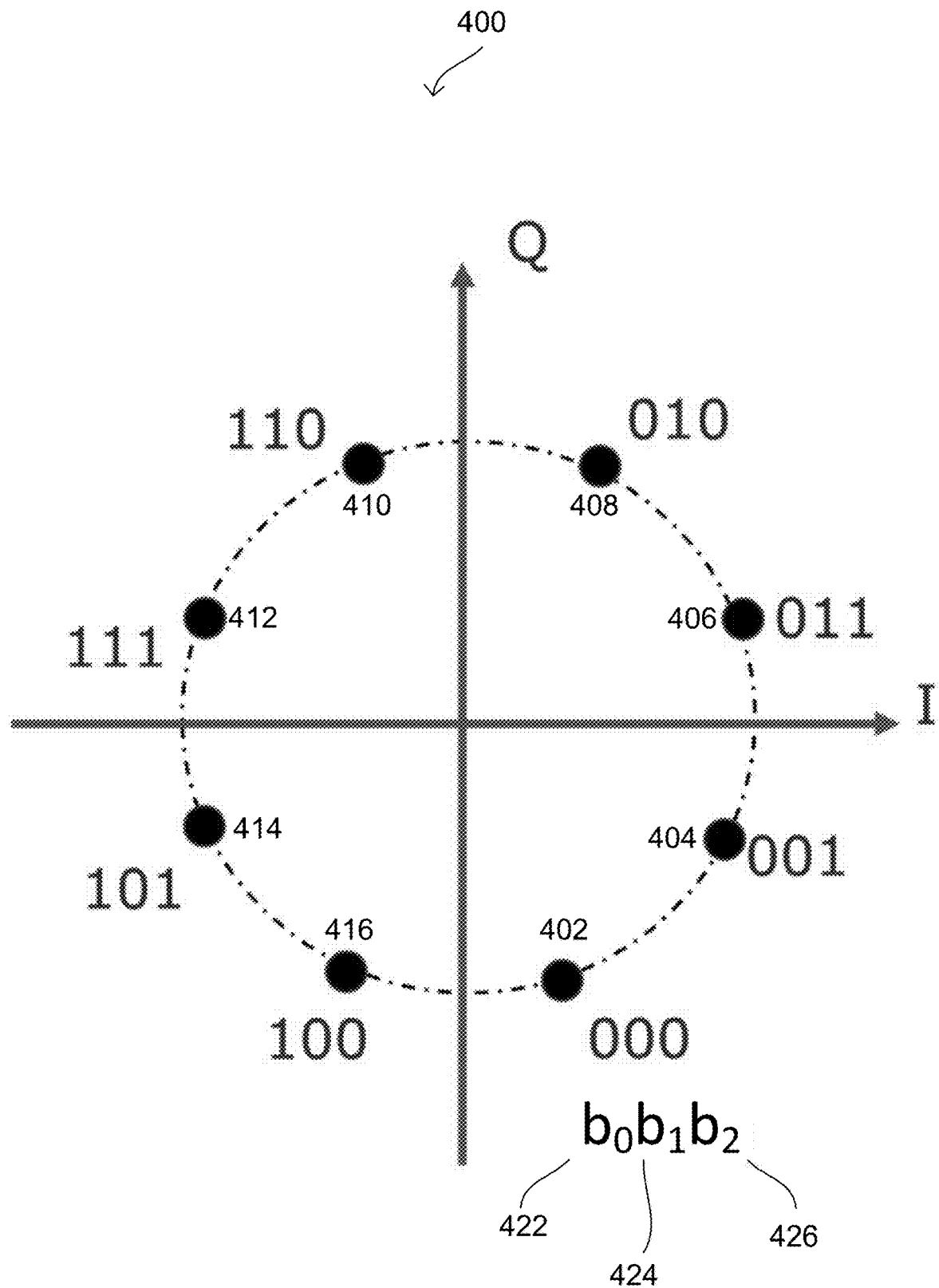
FIG. 4 shows an exemplary scatter plot of constellation points of a constellation scheme according to some aspects.
Figure 6:
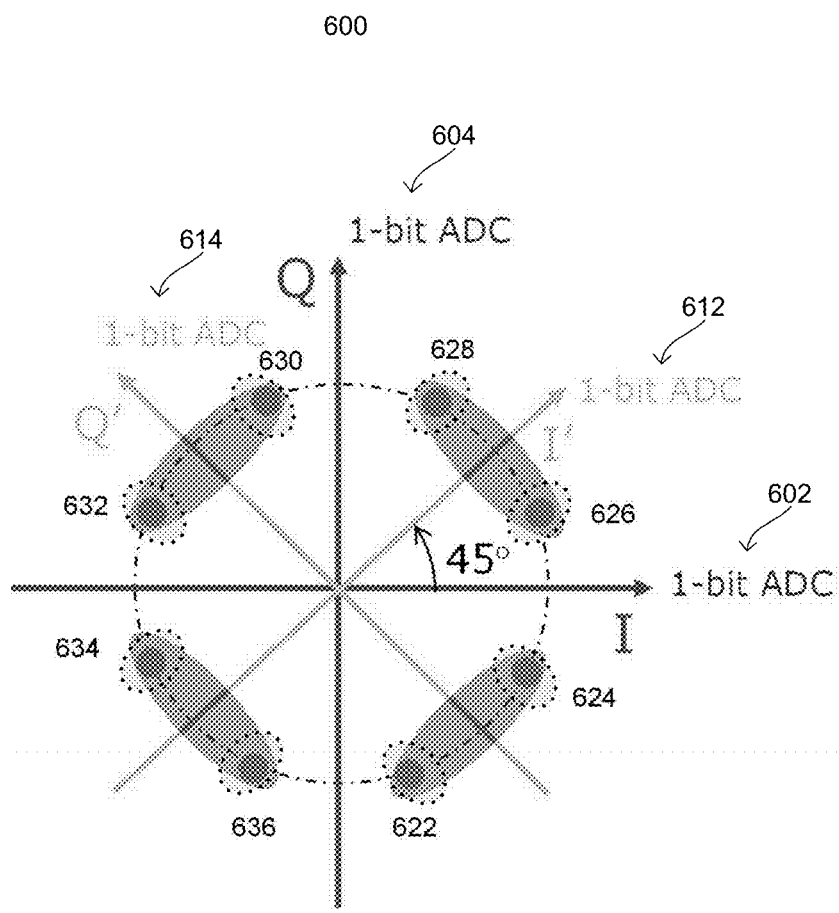
FIG. 6 shows an exemplary method of positioning constellation points according to some aspects.

For each combination of one bit outputs, 332, 334, and 336, polar quantizer 310 may map the constellation points to IQ graph as shown in FIG. 4. The mapping of constellation points may include polar coordinates of the constellation point on the IQ graph. Determining the polar coordinates of the constellation points may include a polar slicing as shown in FIG. 6 below.

FIG. 3 depicts a polar quantizer configured to generate an 8 PSK constellation scheme. But it should be understood that this technique may be expand to other constellation schemes. For example, an polar quantizer configured to generate a 16 PSK constellation scheme may additionally include a 135 degree phase shifter to generate a fourth bit and map 16 constellation points to an IQ graph.

A mixed receiver may receive an RF signal for demodulation. For example, receiving an 8PSK modulated RF signal for polar quantization. The mixed receiver may separate the RF signal into in-phase and quadrature components and send the components to a polar quantizer. The polar quantizer architecture may include one 45 degree phase shifter, four 1-bit ADCs, and one logic gate. The slicer architecture in the present disclosure is power efficient and not sensitive to amplitude errors. A 1-bit ADC requires less power than high resolution ADCs and is not sensitive to the signal amplitude because it does not consider the signal amplitude. The 1-bit ADCs only consider whether the signal is positive or negative. Additionally, the 45 degree phase shifter may be configured for wideband frequencies.

The proposed polar quantizer architecture may improve power performance as compare to demodulating an RF signal with multi-resolution and non-uniform ADCs.

FIG. 4 depicts and IQ graph 400 representing eight constellation points 402-416 of an 8 PSK constellation scheme. The constellation scheme equally spaces constellation points 402-416 in a gray coded scheme. The gray coded scheme ensures that each constellation point has only a 1 bit difference from adjacent constellation points. The horizontal axis represents the in-phase component (I) and the vertical axis represents the quadrature component (Q). Each constellation point includes 3 bits. The first bit 422 represents the in-phase component. The second bit 424 represents the quadrature component. The third bit 426 represents the comparison of the phase shift of the in-phase component and the phase shift of the quadrature component. For example, constellation point 406 includes first bit value 0, second bit value 1, and third bit value 1. The first bit is based on output of ADC 314A, the second bit is based on the output of ADC 314B and the third bit is based on the output of logic gate 316.

Polar quantizer 310 receives a modulated RF signal and determines its I and Q components. Both I and Q components are phase shifted, for example 45 degrees, to generates I and Q phase shifts. Polar quantizer 310 generates three bit values for each of the constellation points 402-416 based on bit values based on the I component, Q component, and a comparison of the I and Q phase shifts. The constellation points are mapped to an I/Q graph using polar coordinates.

Figure 5A:
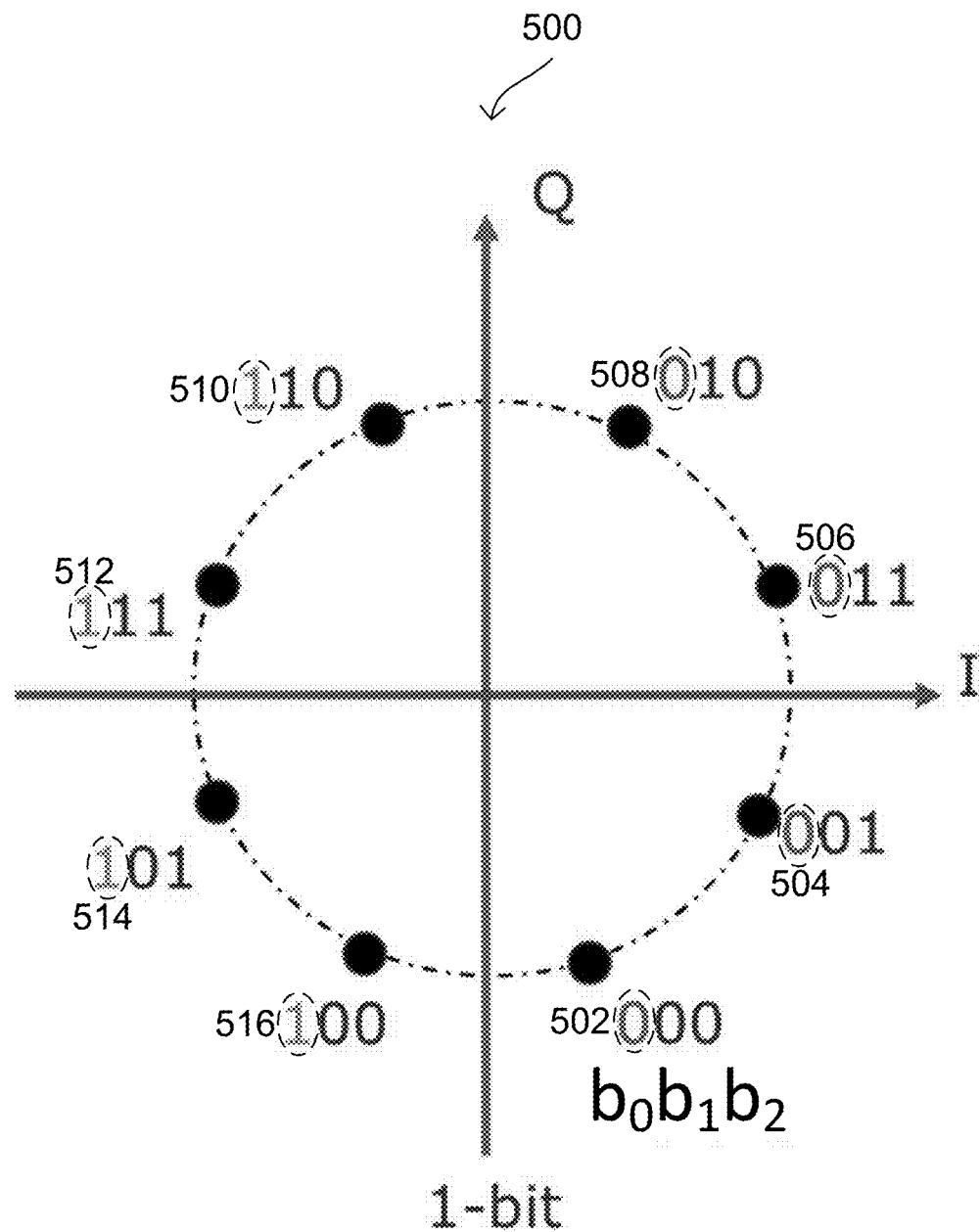
FIGS. 5A-5C show determinations each constellation point bit of a constellation scheme according to some aspects.

FIG. 5A depicts the generation of the first bit values 502-516 for each of the constellation points 402-416 respectively. Let r(t) denote the received RF signal before demodulation. The received signal has two components $r_I(t)$ and $r_Q(t)$ for in-phase and quadrature components respectively. As shown in FIG. 4, the received signal is demodulated to 3 bits, $b_0 b_1 b_2$.

The first bit value is determined with a 1-bit ADC, for example ADC 314A of FIG. 3, using the in-phase component at time t as follows:

$$b_0 = Q_{1-bit}(r_I(t))$$

Where $b_0$ is the first bit value, $Q_{1-bit}$ is a 1-bit quantized value of an analog input, and $r_I(t)$ is a value of the in-phase component at time t.

For example, for a gray coded 8PSK constellation scheme the first bit value is zero if $r_I(t)>0$ as shown FIG. 5A. Similarly, the first bit value is one if $r_I(t)<0$.

Figure 5B:
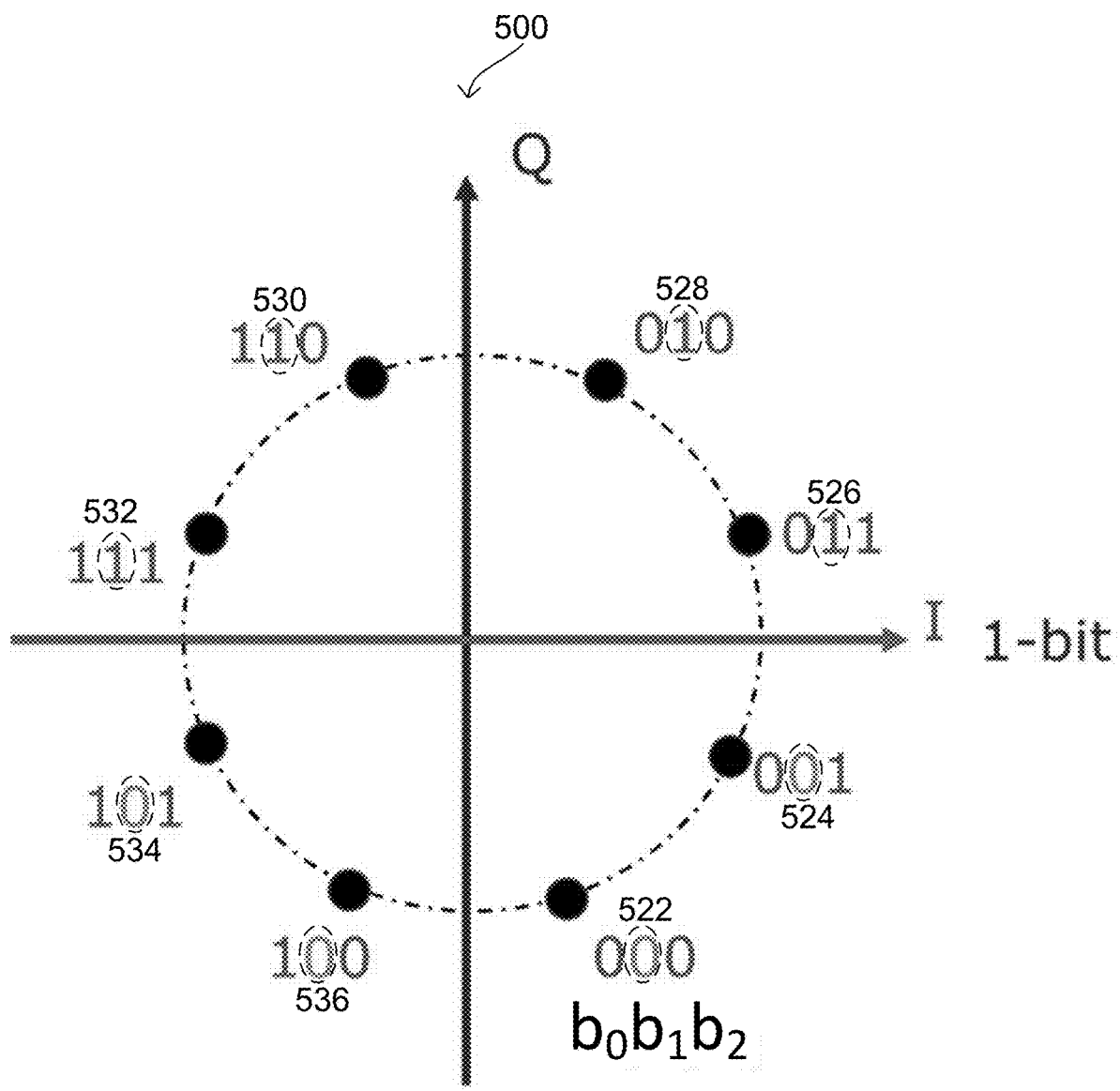

FIG. 5B depicts the generation of the second bit values 522-536 for each of the constellation points 402-416 respectively. The second bit value is determined with a 1-bit ADC, for example ADC 314B of FIG. 3, using the quadrature component at time t as follows:

$$b_1 = Q_{1-bit}(r_Q(t))$$

Where $b_1$ is the second bit value, $Q_{1-bit}$ is a 1-bit quantized value of an analog input, and $r_Q(t)$ is a value of the quadrature component at time t.

Figure 5C:
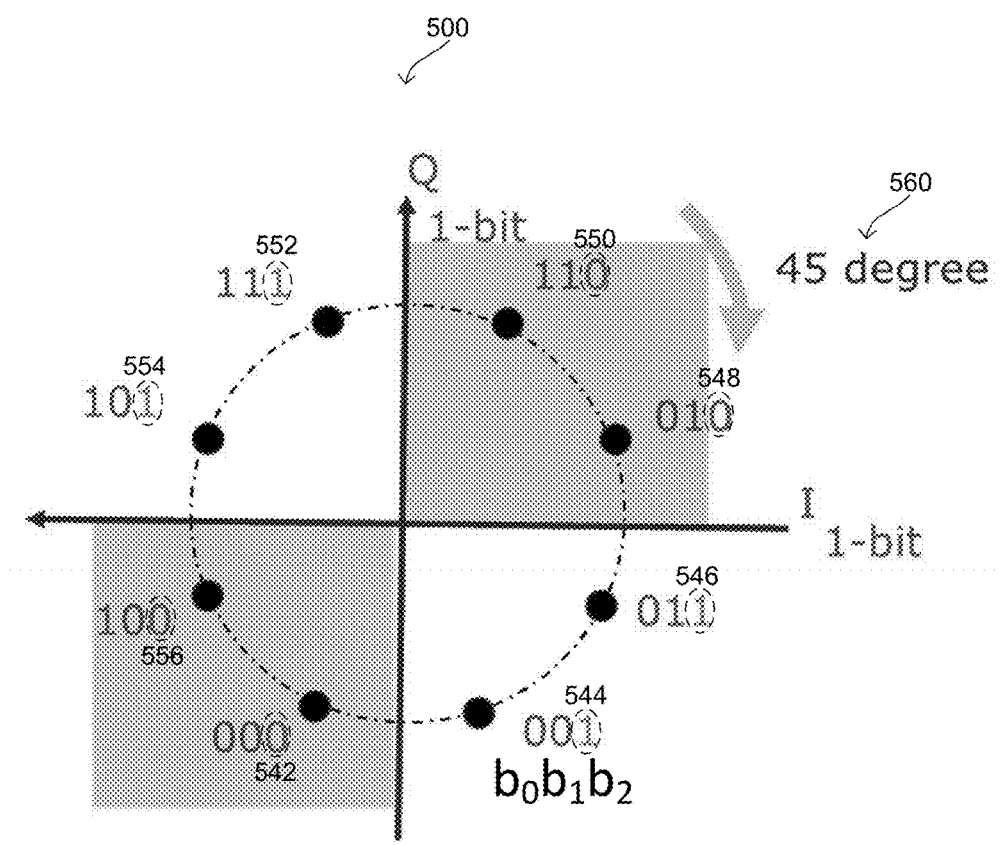

FIG. 5C depicts the generation of the third bit values 542-556 for each of the constellation points 402-416 respectively. The third bit value is determined with a phase shifter, two 1-bit ADCs, and a logic gate. For example, phase shifter 312, ADCs 314C and 314D, and logic gate 316 of FIG. 3. To determine the third bit value the I component and the Q component are each passed through a 45-degree phase shifter to generate I component phase shift $z_I(t)$ and Q component phase shift $z_Q(t)$.

$$z(t) = e^{-j45°}(r_I(t) + jr_Q(t))$$

Where j represents an imaginary unit. Each of the component phase shifts are fed into one of a pair of 1-bit ADCs. The output of ADC is compared by a logic gate to determine the third bit value as follows:

$$b_2 = Q_{1-bit}(z_I(t)) \oplus Q_{1-bit}(z_Q(t))$$

Where $\oplus$ is an XOR operation, $b_2$ is the third bit value, $Q_{1-bit}$ is a 1-bit quantized value of an analog input, and z(t) is a value of a phase shift at time t.

The determination of the third bit is shown in FIG. 5C. The phase rotation shifts constellation points by 45 degrees to align I/Q components with 1-bit ADCs. Then the XOR operation at the output of the ADCs identifies the third bit in the I/Q graph.

FIG. 6 depicts an exemplary position of constellation points on I/Q graph 600. I/Q graph 600 includes a horizontal I axis 602 and a vertical Q axis 604. As shows an 45 degree phase shift may shift the axes and create I' axis 612 and Q axis 614. Overlaying both axes creates eight equal partitions. Constellation points 622 to 636 are positioned in the eight equal partitions. The polar slicing of the IQ graph creates a graph to evenly space the positions of constellation points 622 to 634. However, the positions of constellation points 622 to 636 may be anywhere within its respective partition.

Figure 7:
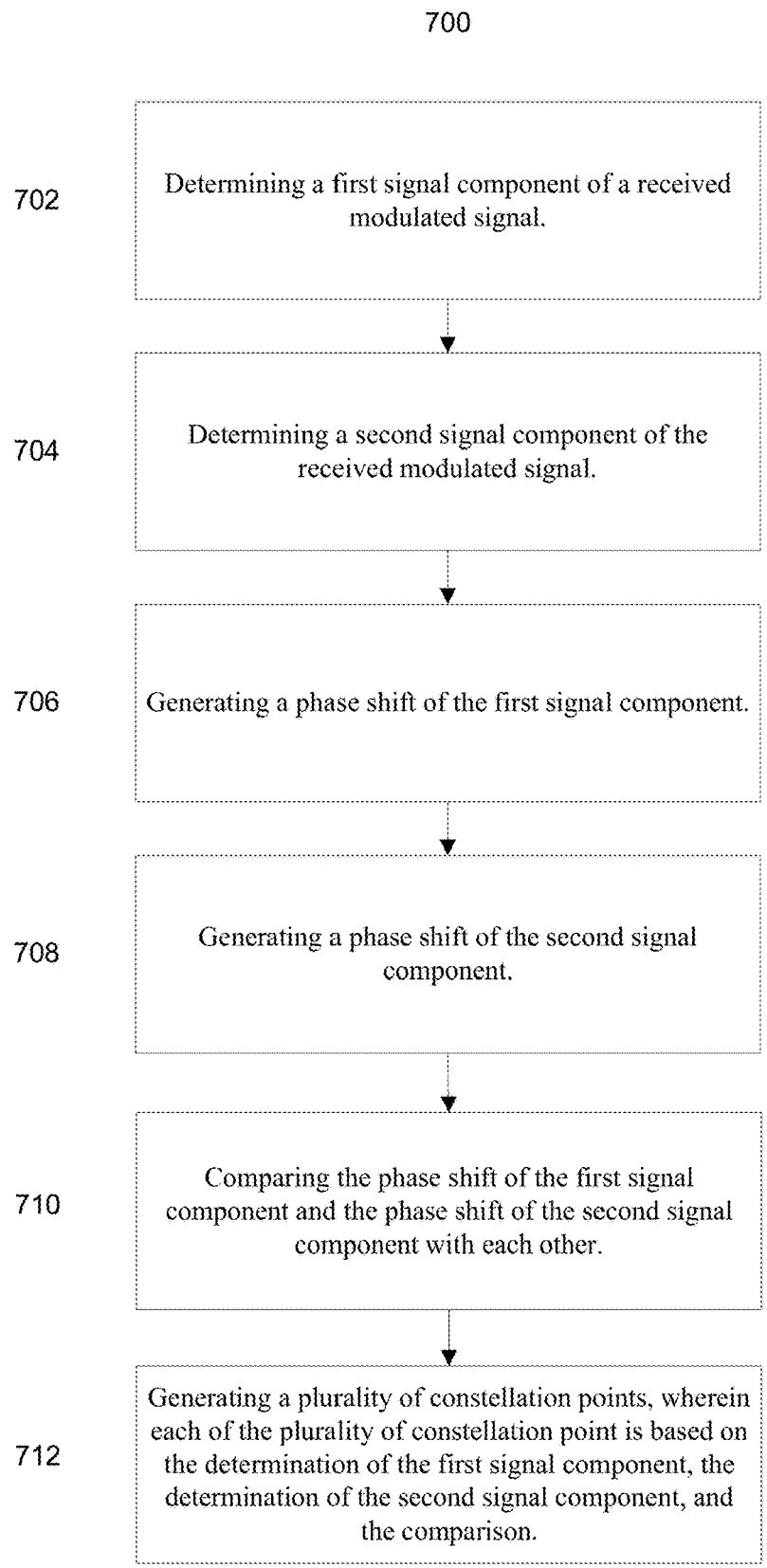
FIG. 7 shows an exemplary method of performing demodulation according to some aspects.

FIG. 7 depicts exemplary method 700 of method of demodulating a signal and generating constellation points of a constellation scheme. As shown in FIG. 7 method 700 includes demodulating a signal. Demodulating the signal includes determining a first signal component of a received modulated signal (stage 702), determining a second signal component of the received modulated signal (stage 704), generating a phase shift of the first signal component (stage 706), generating a phase shift of the second signal component (stage 708), comparing the phase shift of the first signal component and the phase shift of the second signal component with each other (stage 710), and generating a plurality of constellation points, wherein each of the plurality of constellation point is based on the determination of the first signal component, the determination of the second signal component, and the comparison.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples disclose various aspects of this disclosure:

Example 1 is a communication device including one or more processors configured to determine a first signal component of a received modulated signal; determine a second signal component of the received modulated signal; generate a phase shift of the first signal component; generate a phase shift of the second signal component; compare the phase shift of the first signal component and the phase shift of the second signal component with each other; and generate a plurality of constellation points, wherein each of the plurality of constellation point is based on the determination of the first signal component, the determination of the second signal component, and the comparison.

In Example 2, the subject matter of Example 1, may optionally further include a first analog to digital convertor configured to generate a quantized value of the first signal component; a second analog to digital convertor configured to generate a quantized value of the second signal component; a third analog to digital convertor configured to generate a quantized value of the phase shift of the first signal component; and a fourth analog to digital convertor configured to generate a quantized value of the phase shift of the second signal component.

In Example 3, the subject matter of Examples 1 or 2, may optionally further include wherein at least one of the first analog to digital convertor, the second analog to digital convertor, the third analog to digital convertor, or the fourth analog to digital convertor is a 1 bit analog to digital convertor.

In Example 4, the subject matter of Examples 1 to 3, may optionally further include a phase shifter configured to generate a 45 degree phase shift of the first signal component and the second signal component.

In Example 5, the subject matter of Examples 1 to 4, may optionally further include a logic gate configured to compare the quantized value of the phase shift of the first signal component and the quantized value of the phase shift of the second component; and generate a comparison value based on the comparison.

In Example 6, the subject matter of Examples 1 to 5, may optionally further include wherein the logic gate is an XOR logic gate.

In Example 7, the subject matter of Examples 1 to 6, may optionally further include wherein a position of each of the plurality of constellation points is determined according to a gray coded constellation scheme.

In Example 8, the subject matter of Examples 1 to 7, may optionally further include wherein the plurality of constellation points comprises 8 constellation points.

In Example 9, the subject matter of Examples 1 to 8, may optionally further include wherein each of the plurality of constellation points is 3 bits.

In Example 10, the subject matter of Examples 1 to 9, may optionally further include wherein a first bit of each of the plurality of constellation points is the quantized value of the first signal component.

In Example 11, the subject matter of Examples 1 to 10, may optionally further include wherein a second bit of each of the plurality of constellation points is the quantized value of the second signal component.

In Example 12, the subject matter of Examples 1 to 11, may optionally further include wherein a third bit of each of the plurality of constellation points is the comparison value.

Example 13, is a communication device including a memory configured to store instructions; one or more processors coupled to the memory to execute the instructions stored in the memory, wherein the instructions are configured to: determine a first signal component of a received modulated signal; determine a second signal component of the received modulated signal; generate a phase shift of the first signal component; generate a phase shift of the second signal component; compare the phase shift of the first signal component and the phase shift of the second signal component with each other; and generate a plurality of constellation points, wherein each of the plurality of constellation point is based on the determination of the first signal component, the determination of the second signal component, and the comparison.

Example 14 is a communication device including a receiver configured to receive a modulated signal; one or more processors configured to: separate the received modulated signal into an in-phase component and a quadrature component; generate an in-phase phase shift of the in-phase component and a quadrature phase shift of the quadrature component; compare a voltage of the in-phase phase shift and a voltage of the quadrature phase shift; and generate a plurality of constellation points, wherein each of the plurality of constellation point is based on the determination of the first signal component, the determination of the second signal component, and the comparison.

Example 15 is a communication device including a receiver configured to receive a modulated signal; a memory configured to store instructions; one or more processors coupled to the memory to execute the instructions stored in the memory, wherein the instructions are configured to: separate the received modulated signal into an in-phase component and a quadrature component; generate an in-phase phase shift of the in-phase component and a quadrature phase shift of the quadrature component; compare a voltage of the in-phase phase shift and a voltage of the quadrature phase shift; and generate a plurality of constellation points, wherein each of the plurality of constellation point is based on the determination of the first signal component, the determination of the second signal component, and the comparison.

Example 16 is a communication device including one or more processors configured to: separate the received modulated signal into an in-phase component and a quadrature component; generate an in-phase phase shift of the in-phase component and a quadrature phase shift of the quadrature component; compare a voltage of the in-phase phase shift and a voltage of the quadrature phase shift; and generate a plurality of constellation points, wherein each of the plurality of constellation point is based on the determination of the first signal component, the determination of the second signal component, and the comparison.

Example 17 is a communication device including a memory configured to store instructions; one or more processors coupled to the memory to execute the instructions stored in the memory, wherein the instructions are configured to: separate the received modulated signal into an in-phase component and a quadrature component; generate an in-phase phase shift of the in-phase component and a quadrature phase shift of the quadrature component; compare a voltage of the in-phase phase shift and a voltage of the quadrature phase shift; and generate a plurality of constellation points, wherein each of the plurality of constellation point is based on the determination of the first signal component, the determination of the second signal component, and the comparison.

Example 18 is a method including determining a first signal component of a received modulated signal; determining a second signal component of the received modulated signal generating a phase shift of the first signal component; generating a phase shift of the second signal component; comparing the phase shift of the first signal component and the phase shift of the second signal component with each other; and generating a plurality of constellation points, wherein each of the plurality of constellation point is based on the determination of the first signal component, the determination of the second signal component, and the comparison.

In Example 19, the subject matter of Example 18, may optionally further include generating a quantized value of the first signal component; generating a quantized value of the second signal component; generating a quantized value of the phase shift of the first signal component; and generating a quantized value of the phase shift of the second signal component.

In Example 20, the subject matter of Examples 18 or 19, may optionally further include, wherein the phase shift of the first signal component and the phase shift of the second signal component are a 45 degree phase shift.

In Example 21, the subject matter of Examples 18 to 20, may optionally further include comparing the quantized value of the phase shift of the first signal component and the quantized value of the phase shift of the second signal component; and generating a comparison value based on the comparison.

In Example 22, the subject matter of Examples 18 to 21, may optionally further include determining a position of each of the plurality of constellation points according to a gray coded constellation scheme.

In Example 23, the subject matter of Examples 18 to 22, may optionally further include wherein the plurality of constellation points comprises 8 constellation points.

In Example 24, the subject matter of Examples 18 to 23, may optionally further include, wherein each of the plurality of constellation points comprises 3 bits.

In Example 25, the subject matter of Examples 18 to 24, may optionally further include, wherein a first bit of each of the plurality of constellation points is the quantized value of the first signal component.

In Example 26, the subject matter of Examples 18 to 25, may optionally further include, wherein a second bit of each of the plurality of constellation points is the quantized value of the second signal component.

In Example 27, the subject matter of Examples 18 to 26, may optionally further include, wherein a third bit of each of the plurality of constellation points is the comparison value.

Example 28 is a method including separating a received modulated signal into an in-phase component and a quadrature component; generating an in-phase phase shift of the in-phase component and a quadrature phase shift of the quadrature component; comparing a voltage of the in-phase phase shift and a voltage of the quadrature phase shift; and generating a plurality of constellation points, wherein each of the plurality of constellation point is based on the determination of the first signal component, the determination of the second signal component, and the comparison.

In Example 29, the subject matter of Example 28, may optionally further include, wherein the in-phase component is a first signal component: and the quadrature component is a second signal component.

In Example 30, the subject matter of Example 29, may optionally further include the methods according to claims 18 to 27.

Example 31 is a system including one or more devices according to Examples 1 to 17 configured to implement a method according to Examples 18 to 30.

Example 32 is one or more non-transitory computer readable media comprising programmable instructions thereon, that when executed by one or more processors of a device, cause the device to perform any one of the method of Examples 18 to 30.

Example 33 is a means for implementing any of the Examples 1 to 17.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device comprising:
one or more processors configured to:
determine a first signal component of a received modulated signal;
determine a second signal component of the received modulated signal;
generate a phase shift of the first signal component;
generate a phase shift of the second signal component;
compare the phase shift of the first signal component and the phase shift of the second signal component with each other; and generate a plurality of constellation points, wherein each of the plurality of constellation points is based on the determination of the first signal component, the determination of the second signal component, and the comparison.

2. The communication device of claim 1, further comprising:
a first analog to digital convertor configured to generate a quantized value of the first signal component;
a second analog to digital convertor configured to generate a quantized value of the second signal component;
a third analog to digital convertor configured to generate a quantized value of the phase shift of the first signal component; and
a fourth analog to digital convertor configured to generate a quantized value of the phase shift of the second signal component.

3. The communication device of claim 2,
wherein at least one of the first analog to digital convertor, the second analog to digital convertor, the third analog to digital convertor, or the fourth analog to digital convertor is a 1 bit analog to digital convertor.

4. The communication device of claim 2, further comprising:
a phase shifter configured to generate a 45 degree phase shift of the first signal component and the second signal component.

5. The communication device of claim 4, further comprising;
a logic gate configured to compare the quantized value of the phase shift of the first signal component and the quantized value of the phase shift of the second component; and generate a comparison value based on the comparison.

6. The communication device of claim 5,
wherein the logic gate is an XOR logic gate.

7. The communication device of claim 5, wherein a position of each of the plurality of constellation points is determined according to a gray coded constellation scheme.

8. The communication device of claim 5, wherein the plurality of constellation points comprises 8 constellation points.

9. The communication device of claim 6, wherein each of the plurality of constellation points is 3 bits.

10. The communication device of claim 8, wherein a first bit of each of the plurality of constellation points is the quantized value of the first signal component.

11. The communication device of claim 8, wherein a second bit of each of the plurality of constellation points is the quantized value of the second signal component.

12. The communication device of claim 8, wherein a third bit of each of the plurality of constellation points is the comparison value.

13. A method comprising:
determining a first signal component of a received modulated signal;
determining a second signal component of the received modulated signal;
generating a phase shift of the first signal component;
generating a phase shift of the second signal component,
comparing the phase shift of the first signal component and the phase shift of the second signal component with each other; and
generating a plurality of constellation points, wherein each of the plurality of constellation points is based on the determination of the first signal component, the determination of the second signal component, and the comparison.

14. The method of claim 13, further comprising:
generating a quantized value of the first signal component;
generating a quantized value of the second signal component;
generating a quantized value of the phase shift of the first signal component; and
generating a quantized value of the phase shift of the second signal component.

15. The method of claim 14, wherein the phase shift of the first signal component and the phase shift of the second signal component are a 45 degree phase shift.

16. The method of claim 15, further comprising comparing the quantized value of the phase shift of the first signal component and the quantized value of the phase shift of the second component; and
generating a comparison value based on the comparison.

17. The method of claim 16, further comprising determining a position of each of the plurality of constellation points according to a gray coded constellation scheme.

18. The method of claim 17, wherein the plurality of constellation points comprises 8 constellation points.

19. The method of claim 18, wherein each of the plurality of constellation points comprises 3 bits.

20. One or more non-transitory computer readable media comprising programmable instructions thereon, that when executed by one or more processors of a device, cause the device to:
determine a first signal component of a received modulated signal;
determine a second signal component of the received modulated signal;
generate a phase shift of the first signal component;
generate a phase shift of the second signal component;
compare the phase shift of the first signal component and the phase shift of the second signal component with each other; and
generate a plurality of constellation points, wherein each of the plurality of constellation points is based on the determination of the first signal component, the determination of the second signal component, and the comparison.

* * * * *